US012679089B2

(12) United States Patent
Taniguchi et al.

(10) Patent No.: US 12,679,089 B2
(45) Date of Patent: Jul. 14, 2026

(54) LIQUID EJECTING HEAD UNIT AND LIQUID EJECTING APPARATUS

(71) Applicant: SEIKO EPSON CORPORATION, Tokyo (JP)

(72) Inventors: Manabu Taniguchi, Shiojiri (JP); Takanori Aimono, Matsumoto (JP); Akinori Taniuchi, Matsumoto (JP); Masashi Fujioka, Minowa-machi (JP); Eiichiro Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 172 days.

(21) Appl. No.: 18/581,651

(22) Filed: Feb. 20, 2024

(65) Prior Publication Data

US 2024/0294009 A1 Sep. 5, 2024

(30) Foreign Application Priority Data

Feb. 21, 2023 (JP) ................................ 2023-024902

(51) Int. Cl.
*B41J 2/14* (2006.01)

(52) U.S. Cl.
CPC ......... *B41J 2/14201* (2013.01); *B41J 2/1433* (2013.01); *B41J 2002/14306* (2013.01); *B41J 2002/14475* (2013.01)

(58) Field of Classification Search
CPC .. B41J 2/1433; B41J 2/14201; B41J 2/14233; B41J 2002/14306; B41J 2002/14475; B41J 2002/14491; B41J 2002/14419; B41J 2202/12; B41J 2/162
See application file for complete search history.

(56) References Cited

U.S. PATENT DOCUMENTS 8,864,266 B2 * 10/2014 Suzuki .................. B41J 2/2125 347/15
2006/0103691 A1 * 5/2006 Dietl ...................... B41J 2/2125 347/40
2020/0207090 A1 * 7/2020 Miyagishi ............ B41J 2/14145
2021/0237442 A1 8/2021 Naganuma

FOREIGN PATENT DOCUMENTS

JP 2021-119042 A 8/2021

* cited by examiner

*Primary Examiner* — Kristal Feggins
(74) *Attorney, Agent, or Firm* — WORKMAN NYDEGGER

(57) ABSTRACT

The first nozzle includes a first portion and a second portion. The second nozzle includes a third portion and a fourth portion. The capacity of the first portion is smaller than the capacity of the second portion. The capacity of the third portion is smaller than the capacity of the fourth portion. The capacity of the first portion is smaller than the capacity of the third portion. The length of the second portion in the X direction is greater than the length of the fourth portion in the X direction.

19 Claims, 10 Drawing Sheets

LIQUID EJECTING HEAD UNIT AND LIQUID EJECTING APPARATUS

The present application is based on, and claims priority from JP Application Serial Number 2023-024902, filed Feb. 21, 2023, the disclosure of which is hereby incorporated by reference herein in its entirety.

BACKGROUND

1. Technical Field

The present disclosure relates to a liquid ejecting head unit and a liquid ejecting apparatus.

2. Related Art

For example, as disclosed in JP-A-2021-119042, the following liquid ejecting head is known. The liquid ejecting head has a structure in which liquid circulates through a nozzle flow passage and the liquid is ejected in a direction orthogonal to the nozzle flow passage. In such a liquid ejecting head, a two-tiered nozzle is sometimes used for the purpose of suppressing a satellite droplet and for the purpose of supplying liquid to the nozzle efficiently. The two-tiered nozzle includes a first portion and a second portion. A liquid droplet is ejected from the first portion. The second portion is continuous from the nozzle flow passage and continuous to the first portion. The second portion has capacity larger than that of the first portion. Moreover, a liquid ejecting head that includes, in addition to ordinary nozzles, micro nozzles for ejecting micro droplets are known.

When a two-tiered nozzle structure is applied to both an ordinary nozzle and a micro nozzle, the performance of ejecting liquid improves at the ordinary nozzle as described above, whereas, at the micro nozzle, since an amount of liquid that is ejected is small, that is, since the capacity of its first portion is relatively small, the liquid is prone to stagnate and, therefore, there is a risk that the viscosity of the liquid in the micro nozzle might increase. As the viscosity of the liquid increases, a failure to eject the liquid properly could occur more frequently. A technique that makes it possible to apply a two-tiered nozzle structure to both an ordinary nozzle and a micro nozzle and improve the performance of ejecting liquid both for the ordinary nozzle and for the micro nozzle is demanded.

SUMMARY

The present disclosure can be embodied in the following mode, though not limited thereto.

In a certain mode of the present disclosure, a liquid ejecting head unit is provided. The liquid ejecting head unit includes: a plurality of first nozzle flow passages extending in an X direction, liquid flowing therethrough in the X direction; a plurality of first nozzles arranged in a Y direction intersecting with the X direction, each of the plurality of first nozzles being continuous from corresponding one of the plurality of first nozzle flow passages, the liquid flowing through the first nozzle flow passage in the X direction being ejected from the first nozzle in a Z direction intersecting with the X direction and with the Y direction; a plurality of second nozzle flow passages extending in the X direction, liquid flowing therethrough in the X direction; and a plurality of second nozzles arranged in the Y direction, each of the plurality of second nozzles being continuous from corresponding one of the plurality of second nozzle flow passages, the liquid flowing through the second nozzle flow passage in the X direction being ejected from the second nozzle in the Z direction, wherein the first nozzle includes a first portion and a second portion, the second portion being located closer to the first nozzle flow passage in the Z direction than the first portion is, the second nozzle includes a third portion and a fourth portion, the fourth portion being located closer to the second nozzle flow passage in the Z direction than the third portion is, capacity of the first portion is smaller than capacity of the second portion, capacity of the third portion is smaller than capacity of the fourth portion, the capacity of the first portion is smaller than the capacity of the third portion, and a length of the second portion in the X direction is greater than a length of the fourth portion in the X direction.

DESCRIPTION OF EMBODIMENTS

A. Embodiment

A1. Configuration of Liquid Ejecting Apparatus 100

Figure 1:
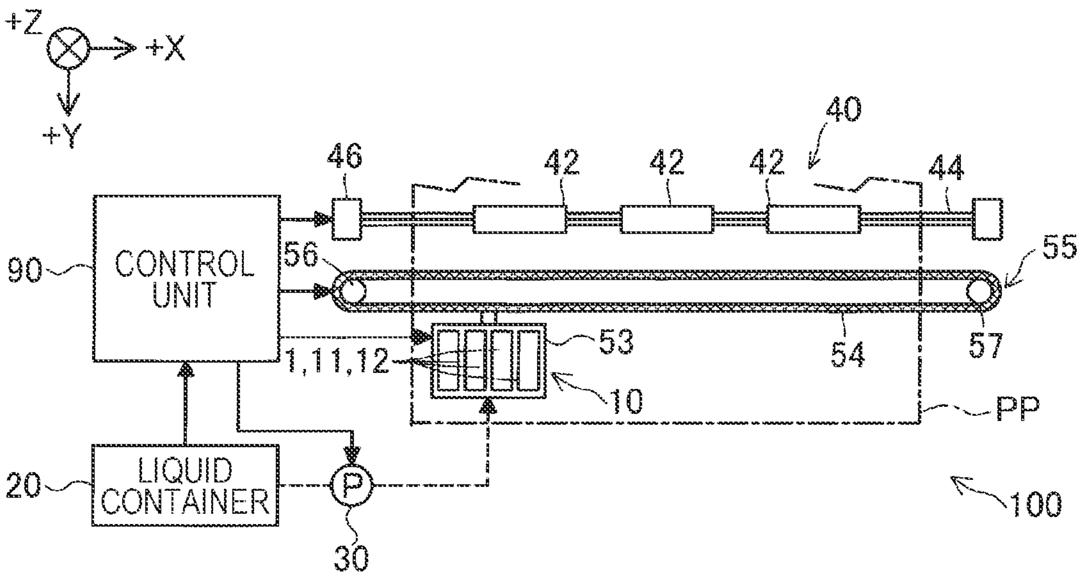
FIG. 1 is a diagram for explaining a schematic configuration of a liquid ejecting apparatus according to an embodiment of the present disclosure.

FIG. 1 is a diagram for explaining a schematic configuration of a liquid ejecting apparatus 100 according to an embodiment of the present disclosure. In the present embodiment, the liquid ejecting apparatus 100 is an ink-jet printer that forms an image by ejecting ink, which is an example of liquid, onto printing paper PP. The liquid ejecting apparatus 100 may eject ink to any of various kinds of a medium such as a resin film, a cloth, or the like in place of the printing paper PP. In FIG. 1, an X axis, a Y axis, and a Z axis, which are three axes orthogonal to one another, are illustrated. All of an X axis, a Y axis, and a Z axis that are illustrated in other drawings correspond to the X axis, the Y axis, and the Z axis of FIG. 1.

The liquid ejecting apparatus 100 includes a liquid ejecting head unit 10, a liquid container(s) 20, a circulation mechanism 30, a transportation mechanism 40, a movement mechanism 55, and a control unit 90.

The liquid ejecting head unit 10 is made up of a plurality of liquid ejecting heads 1. The liquid ejecting head 1 includes many nozzles (nozzles N to be described later) and forms an image on the printing paper PP by ejecting ink in the −Z direction. A detailed configuration of the liquid ejecting head 1 will be described later. As the ink that is ejected, for example, ink of four colors in total such as black, cyan, magenta, and yellow may be ejected. The colors of the ink are not limited to the four colors mentioned above. Ink of any colors such as light cyan, light magenta, white, and/or the like may be ejected. The liquid ejecting heads 1 are mounted on a carriage 53 (to be described later) of the movement mechanism 55 and reciprocate in a main scanning direction together with the carriage 53. In the present embodiment, the main scanning direction includes the +X direction and the −X direction (hereinafter referred to also as "X direction").

The liquid container 20 contains the ink to be ejected from the liquid ejecting head 1. For example, as the ink, ink having pigments dispersed as a colorant in a dissolvent, ink containing dye, or ink containing both pigments and dye as colorants can be used. The ink may include various kinds of liquid composition such as popular water-based ink, oil-based ink, gel ink, hot melt ink, etc. The liquid container 20 is, for example, a cartridge that can be detachably attached to the liquid ejecting apparatus 100, a bag-type ink pack made of a flexible film material, an ink tank that can be refilled with ink, or the like.

The circulation mechanism 30 is a device configured to, under the control of the control unit 90, supply the liquid contained in the liquid container 20 to the liquid ejecting head 1. For example, the circulation mechanism 30 is a pump. Moreover, the circulation mechanism 30 collects ink that remains inside the liquid ejecting head 1 and causes the collected ink to flow back to the liquid ejecting head 1.

The transportation mechanism 40 transports the printing paper PP in a sub-scanning direction. The sub-scanning direction is orthogonal to the main scanning direction (X direction), and, in the present embodiment, includes the +Y direction and the −Y direction (hereinafter referred to also as "Y direction"). The transportation mechanism 40 includes a transportation rod 44 to which three transportation rollers 42 are attached, and a transporting motor 46 configured to drive the transportation rod 44 for rotation. When the transportation rod 44 is driven to rotate by the transporting motor 46, the plurality of transportation rollers 42 rotates to transport the printing paper PP in the sub-scanning direction (the +Y direction). The number of the transportation rollers 42 is not limited to three; it may be any number. A plurality of transportation mechanisms 40 may be provided.

The movement mechanism 55 includes a transportation belt 54, a moving motor 56, and a pulley 57, in addition to the carriage 53 described above. On the carriage 53, the liquid ejecting heads 1 are mounted in a state of being able to eject ink. The carriage 53 is attached to the transportation belt 54. The transportation belt 54 is stretched between the moving motor 56 and the pulley 57. Driven by the moving motor 56, the transportation belt 54 reciprocates in the main scanning direction. The carriage 53 attached to the transportation belt 54 also reciprocates in the main scanning direction due to this belt motion.

The control unit 90 controls operation for ejecting ink. For example, the control unit 90 controls the reciprocating motion of the carriage 53 in the main scanning direction and the transportation of the printing paper PP in the sub-scanning direction. Moreover, for example, the control unit 90 controls the ejection of the ink onto the printing paper PP by driving piezoelectric elements (piezoelectric elements PZ1 and PZ2 to be described later) by outputting a drive signal to the liquid ejecting head unit 10. The control unit 90 may include, for example, a processing circuit such as a CPU (central processing unit) or an FPGA (field programmable gate array), and a storage circuit such as a semiconductor memory.

A2. Detailed Configuration of Liquid Ejecting Head 1

Figure 2:
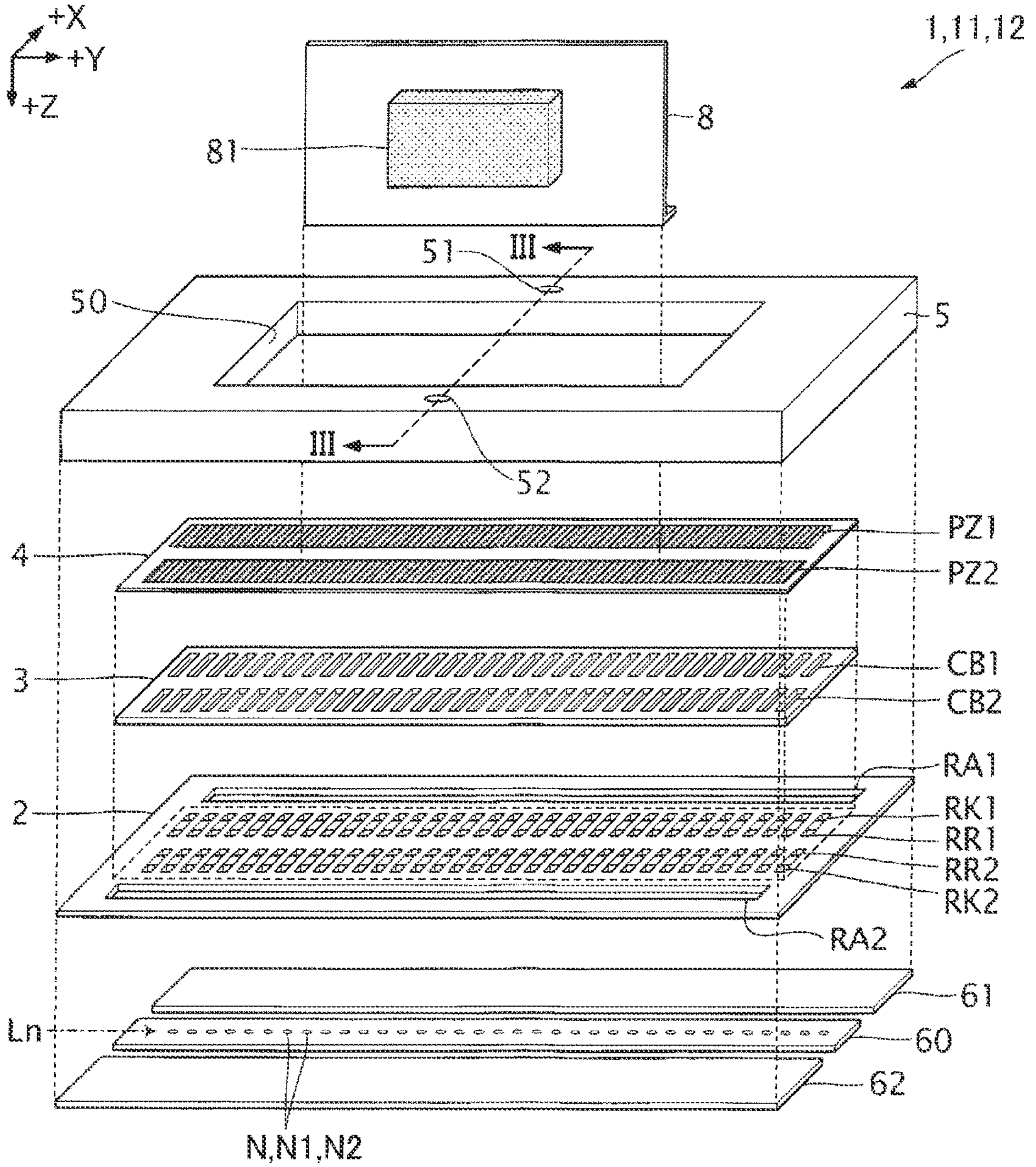
FIG. 2 is an exploded perspective view of a detailed configuration of a liquid ejecting head illustrated in FIG. 1.
Figure 3:
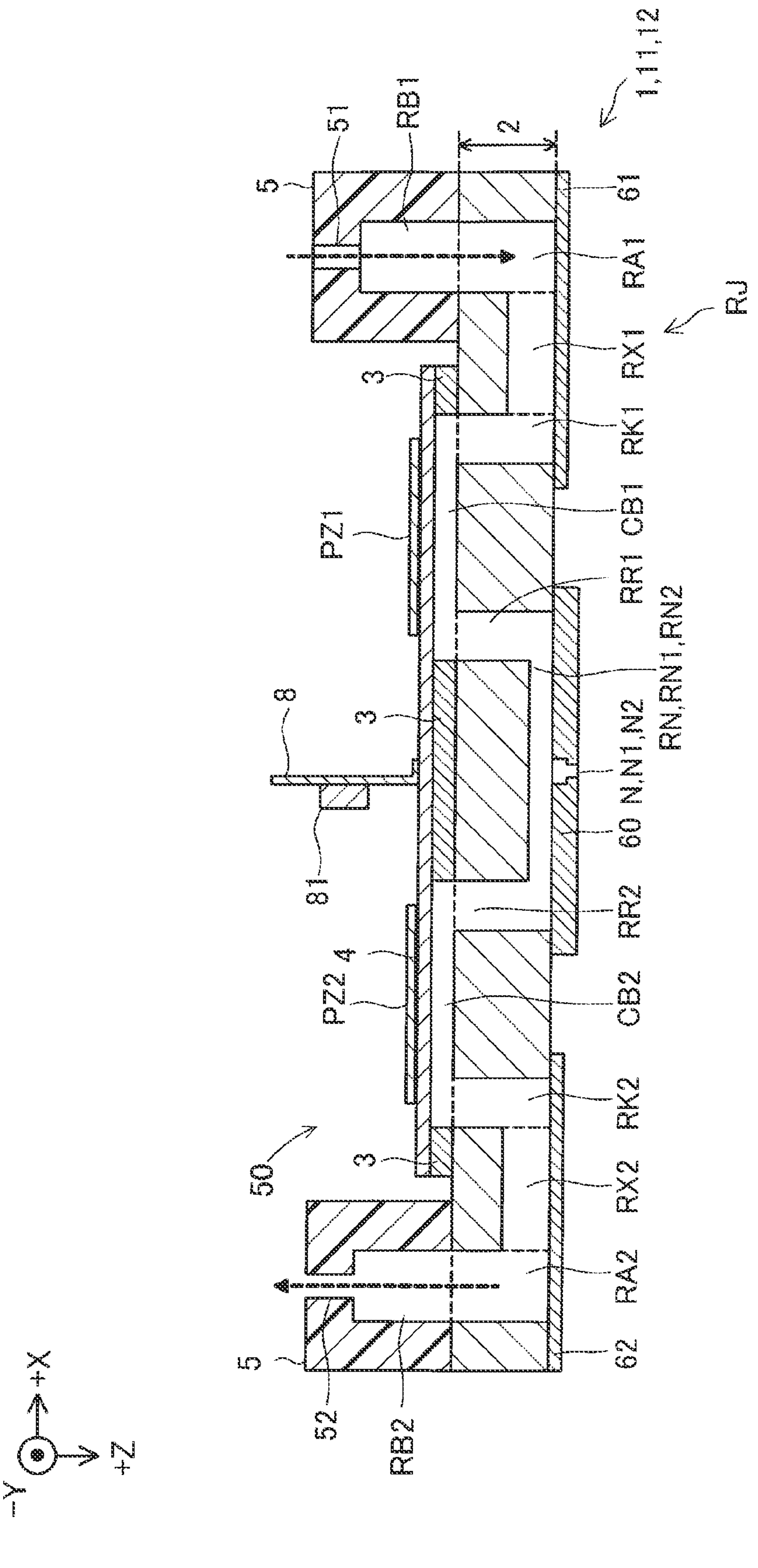
FIG. 3 is a cross-sectional view of a detailed configuration of the liquid ejecting head.
Figure 4:
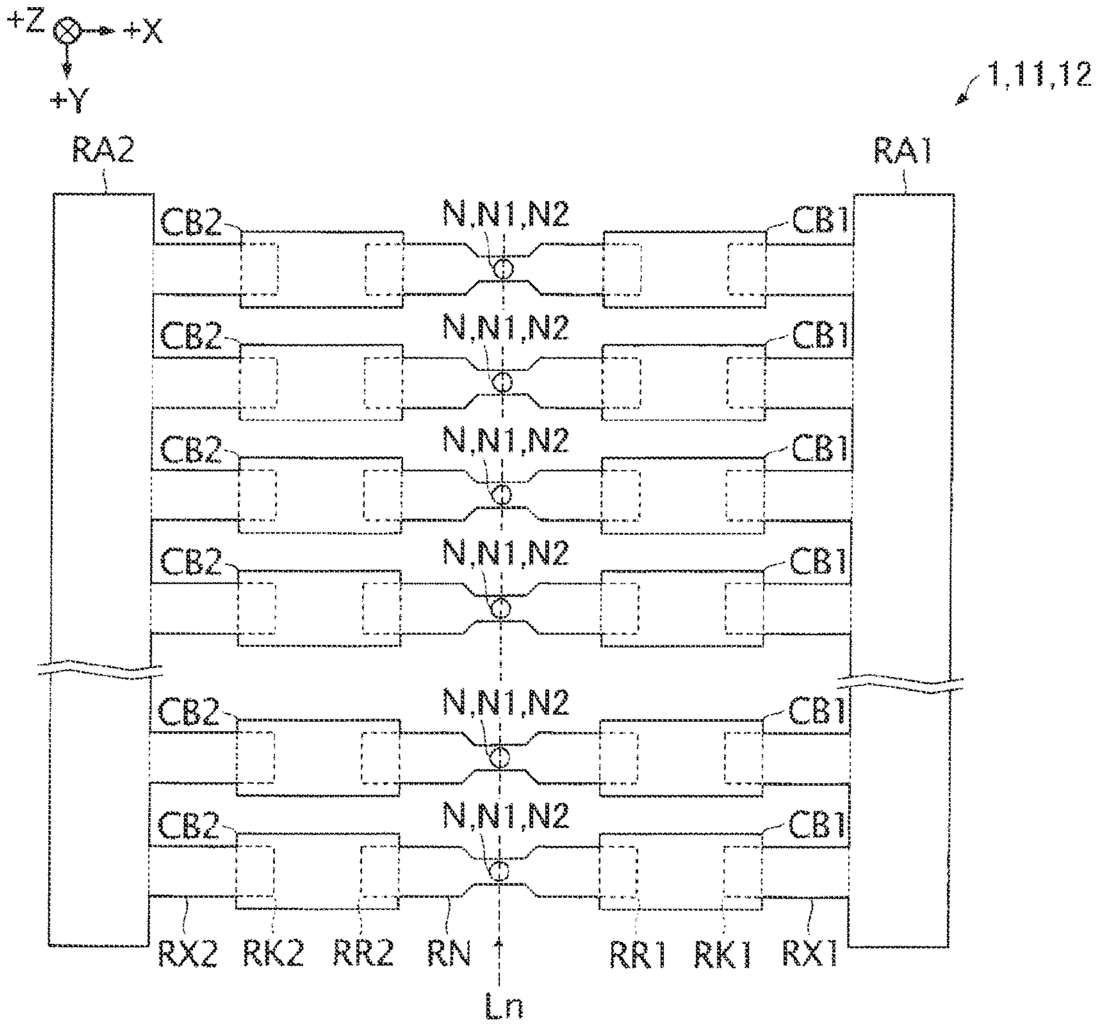
FIG. 4 is a plan view of the liquid ejecting head viewed in the −Z direction.

FIG. 2 is an exploded perspective view of a detailed configuration of the liquid ejecting head 1 illustrated in FIG. 1. FIG. 3 is a cross-sectional view of a detailed configuration of the liquid ejecting head 1. A cross section taken along the line III-III of FIG. 2 is illustrated in FIG. 3. FIG. 4 is a plan view of the liquid ejecting head 1 viewed in the −Z direction. Though a detailed description will be given later, the liquid ejecting head unit 10 according to the present embodiment includes the plurality of liquid ejecting heads 1. Specifically, the liquid ejecting head unit 10 includes a first liquid ejecting head 11 including a first nozzle(s) N1 and a second liquid ejecting head 12 including a second nozzle(s) N2 larger in capacity than the first nozzle N1. A detailed description of the first nozzle N1 and the second nozzle N2 will be given later. The configuration of the first liquid ejecting head 11 and the configuration of the second liquid ejecting head 12 are the same as each other, except for the nozzles N. Therefore, the first liquid ejecting head 11 and the second liquid ejecting head 12 will be described collectively as the liquid ejecting head 1 below, without making a distinction therebetween. The first liquid ejecting head 11 and the second liquid ejecting head 12 that eject ink of the same color may be disposed adjacent to each other or disposed apart from each other.

As illustrated in FIG. 2, the liquid ejecting head 1 includes a nozzle substrate 60, a communication plate 2, a pressure compartment substrate 3, a diaphragm 4, a reservoir forming substrate 5, a wiring substrate 8, and compliance sheets 61 and 62.

As illustrated in FIG. 2, the nozzle substrate 60 is a plate-like member that has longer sides in the Y direction. The nozzle substrate 60 is located at the most −Z-directional position in the liquid ejecting head 1. The nozzle substrate 60 is manufactured by processing, for example, a monocrystalline silicon substrate. A plurality of nozzles N the number of which is M is formed in the nozzle substrate 60. The number M is any integer that is not less than one. The nozzle N is formed as a through hole going through the nozzle substrate 60 in its thickness direction (Z direction). The nozzle N corresponds to an orifice through which ink is ejected from the liquid ejecting head 1. In the present embodiment, the nozzles N, the number of which is M, are arranged linearly in such a way as to form a nozzle row Ln extending in the Y direction. As illustrated in FIG. 3, the nozzle N according to the present embodiment is a two-tiered nozzle. The term "two-tiered nozzle" means a nozzle that has a structure in which two portions having different capacities are connected in the Z direction.

As illustrated in FIG. 2, flow passages through which ink flows are formed in the communication plate 2. Specifically, a single common supply flow passage RA1 extending in the Y direction and a single common discharge flow passage RA2 extending in the Y direction are formed in the communication plate 2. As illustrated in FIG. 3, in addition, M-number of nozzle flow passages RN, M-number of supply flow passages RR1, M-number of discharge flow passages RR2, M-number of communication flow passages RK1, M-number of communication flow passages RK2, M-number of communication flow passages RX1, and M-number of communication flow passages RX2, which correspond to the M-number of nozzles N respectively, are formed in the communication plate 2.

As illustrated in FIG. 3, the communication flow passage RX1 is continuous from the common supply flow passage RA1. The communication flow passage RX1 extends in the −X direction from the common supply flow passage RA1 along the X-directional axis. The communication flow passage RX1 is continuous to the communication flow passage RK1. The communication flow passage RK1 extends in the −Z direction from the communication flow passage RX1 along the Z-directional axis. The communication flow passage RK1 is continuous to one end of a pressure compartment CB1 to be described later. The other end of the pressure compartment CB1 is continuous to the supply flow passage RR1. The supply flow passage RR1 extends in the +Z direction from the pressure compartment CB1 along the Z-directional axis. The supply flow passage RR1 is continuous to one end of the nozzle flow passage RN. The nozzle flow passage RN extends in the X direction, and one nozzle N is provided in the neighborhood of the center thereof. A part of ink flowing through the nozzle flow passage RN in the X direction is ejected from the nozzle N.

The other end of the nozzle flow passage RN is continuous to the discharge flow passage RR2. The discharge flow passage RR2 extends in the −Z direction from the nozzle flow passage RN along the Z-directional axis. The discharge flow passage RR2 is continuous to one end of a pressure compartment CB2 to be described later. The other end of the pressure compartment CB2 is continuous to the communication flow passage RK2. The communication flow passage RK2 extends in the +Z direction from the pressure compartment CB2 along the Z-directional axis. The communication flow passage RK2 is continuous to one end of the communication flow passage RX2. The communication flow passage RX2 extends in the −X direction from the communication flow passage RK2 along the X-directional axis. The other end of the communication flow passage RX2 is continuous to the common discharge flow passage RA2.

As illustrated in FIGS. 2 and 3, the compliance sheet 61 is disposed on the +Z-side surface of the communication plate 2 in such a way as to hermetically close the common supply flow passage RA1, the communication flow passage RX1, and the communication flow passage RK1. The compliance sheet 61 absorbs the pressure fluctuations of ink inside the common supply flow passage RA1, the communication flow passage RX1, and the communication flow passage RK1. The compliance sheet 62 is disposed on the +Z-side surface of the communication plate 2 in such a way as to hermetically close the common discharge flow passage RA2, the communication flow passage RX2, and the communication flow passage RK2. The compliance sheet 62 absorbs the pressure fluctuations of ink inside the common discharge flow passage RA2, the communication flow passage RX2, and the communication flow passage RK2. The compliance sheet 61, 62 is a flexible sheet-like member that is elastically deformable.

As illustrated in FIGS. 2 and 3, the reservoir forming substrate 5 is disposed on the —Z-side surface of the communication plate 2. The reservoir forming substrate 5 is a member that has longer sides in the Y direction. The reservoir forming substrate 5 is formed by, for example, injection molding of a resin material. Flow passages through which ink flows are formed inside the reservoir forming substrate 5. Specifically, a single common supply flow passage RB1 and a single common discharge flow passage RB2 are formed in the reservoir forming substrate 5. The common supply flow passage RB1 is in communication with the common supply flow passage RA1. The common discharge flow passage RB2 is in communication with the common discharge flow passage RA2.

An inlet 51 that is in communication with the common supply flow passage RB1 and an outlet 52 that is in communication with the common discharge flow passage RB2 are provided in the reservoir forming substrate 5. Ink is supplied from the liquid container 20 to the common supply flow passage RB1 through the inlet 51. Ink having been pooled in the common discharge flow passage RB2 is collected through the outlet 52.

In the present embodiment, ink supplied from the liquid container 20 to the inlet 51 by the circulation mechanism 30 flows through the common supply flow passage RB1 into the common supply flow passage RA1. A part of the ink that has flowed into the common supply flow passage RA1 is split to flow through the communication flow passages RX1 and next through the communication flow passages RK1 and then flows into each of the pressure compartments CB1. A part of the ink that has flowed into the pressure compartment CB1 flows through the supply flow passage RR1, the nozzle flow passage RN, and the discharge flow passage RR2 in this order and then flows into the pressure compartment CB2. A part of the ink that has flowed into the pressure compartment CB2 flows through the communication flow passage RK2 and the communication flow passage RX2 in this order, thereafter merges with the ink of the other branches at the common discharge flow passage RA2, and then flows through the common discharge flow passage RB2 to be discharged through the outlet 52. In the description given below, the flow path of ink from the common supply flow passage RA1 to the common discharge flow passage RA2 will be referred to also as "circulation flow passage RJ". Specifically, the circulation flow passage RJ includes the common supply flow passage RA1, the communication flow passage RX1, the communication flow passage RK1, the pressure compartment CB1, the supply flow passage RR1, the nozzle flow passage RN, the discharge flow passage RR2, the pressure compartment CB2, the communication flow passage RK2, the communication flow passage RX2, and the common discharge flow passage RA2. The M-number of circulation flow passages RJ are arranged in the Y direction. As illustrated in FIG. 4, the common supply flow passage RA1 is connected to the common discharge flow passage RA2 via the M-number of circulation flow passages RJ corresponding respectively to the M-number of nozzles N. That is, ink is supplied via the common supply flow passage RA1 to each of the M-number of nozzle flow passages RN, and ink is discharged from each of the M-number of nozzle flow passages RN via the common discharge flow passage RA2. It can also be said that the common supply flow passage RA1 is connected indirectly to one end of the nozzle flow passages RN, and the common discharge flow passage RA2 is connected indirectly to the other end of the nozzle flow passages RN. Each of the common supply flow passage RA1 and the common discharge flow passage RA2 may be connected directly to the nozzle flow passages RN.

As illustrated in FIGS. 2 and 3, the reservoir forming substrate 5 has an opening 50. The pressure compartment substrate 3, the diaphragm 4, and the wiring substrate 8 are provided inside the opening 50. The pressure compartment substrate 3 is a plate-like member that has longer sides in the Y direction. The pressure compartment substrate 3 is provided on the −Z-side surface of the communication plate 2. The pressure compartment substrate 3 is disposed substantially in parallel with an X-Y plane. The pressure compartment substrate 3 is manufactured by, for example, processing a monocrystalline silicon substrate by using an etching technology. Flow passages through which ink flows are formed in the pressure compartment substrate 3. Specifically, the M-number of pressure compartments CB1 corresponding respectively to the M-number of nozzles N, and the M-number of pressure compartments CB2 corresponding respectively to the M-number of nozzles N, are formed in the pressure compartment substrate 3.

The pressure compartment CB1 extends in the X direction in such a way as to provide communication between the communication flow passage RK1 and the supply flow passage RR1. The pressure compartment CB2 extends in the X direction in such a way as to provide communication between the communication flow passage RK2 and the discharge flow passage RR2.

The diaphragm 4 is a plate-like member that has longer sides in the Y direction. As illustrated in FIGS. 2 and 3, the diaphragm 4 is provided on the −Z-side surface of the pressure compartment substrate 3. The diaphragm 4 is a member that is capable of vibrating elastically, and applies pressure to the ink that is present inside the pressure compartment CB1, CB2. The diaphragm 4 is disposed substantially in parallel with an X-Y plane. On the −Z-side surface of the diaphragm 4, M-number of piezoelectric elements PZ1 corresponding respectively to the M-number of pressure compartments CB1, and M-number of piezoelectric elements PZ2 corresponding respectively to the M-number of pressure compartments CB2, are provided. The piezoelectric element PZ1, PZ2 is an energy conversion element that converts the electric energy of a drive signal transmitted from the control unit 90 into motion energy. In the present embodiment, the piezoelectric element PZ1, PZ2 is a passive element that deforms in accordance with a change in potential of the drive signal.

The wiring substrate 8 is mounted on the −Z-side surface of the diaphragm 4. The wiring substrate 8 is a component that provides electric connection between the control unit 90 and the liquid ejecting head 1. A flexible wiring board such as, for example, FPC or FFC is used as the wiring substrate 8. A drive circuit 81 is mounted on the wiring substrate 8. Based on a control signal, the drive circuit 81 switches whether or not to supply a drive signal to the piezoelectric element PZ1, PZ2.

The piezoelectric element PZ1, PZ2 deforms in accordance with a change in potential of the drive signal. The diaphragm 4 vibrates by being driven by the deformation of the piezoelectric element PZ1, PZ2. The vibration of the diaphragm 4 causes a change in the internal pressure of the pressure compartment CB1, CB2. Due to the change in the internal pressure of the pressure compartment CB1, CB2, ink with which the inside of the pressure compartment CB1, CB2 is filled is ejected from the nozzle N after flowing through the supply flow passage RR1/the discharge flow passage RR2 and the nozzle flow passage RN. Specifically, when the piezoelectric element PZ1 is driven by means of a drive signal, a part of the ink with which the inside of the pressure compartment CB1 is filled flows through the supply flow passage RR1 and then through the nozzle flow passage RN to be ejected from the nozzle N. When the piezoelectric element PZ2 is driven by means of a drive signal, a part of the ink with which the inside of the pressure compartment CB2 is filled flows through the discharge flow passage RR2 and then through the nozzle flow passage RN to be ejected from the nozzle N.

The liquid ejecting apparatus 100 according to the present embodiment circulates the ink from the common supply flow passage RA1 to the common discharge flow passage RA2 through the circulation flow passages RJ. For this reason, even if there is a period during which no ink that is present inside the pressure compartment CB1, CB2 is ejected from the nozzle N, it is possible to reduce or prevent the stagnation of the ink inside the pressure compartment CB1, CB2, the nozzle flow passage RN, and the like. Therefore, the liquid ejecting apparatus 100 according to the present embodiment makes it possible to reduce or prevent an increase in the viscosity of the ink inside the pressure compartment CB1, CB2, the nozzle flow passage RN, and the like and thus suppress the occurrence of ejection abnormality that disables the ejection of the ink from the nozzle N.

The liquid ejecting apparatus 100 according to the present embodiment ejects, from the nozzle N, the ink with which the inside of the pressure compartment CB1 is filled and the ink with which the inside of the pressure compartment CB2 is filled. Therefore, for example, as compared with a structure in which the ink of one pressure compartment CB1, CB2 only is ejected from the nozzle N, the liquid ejecting apparatus 100 according to the present embodiment makes it possible to make an amount of the ink ejected from the nozzle N larger.

A3. Detailed Structure of First Nozzle N1 and Second Nozzle N2

Figure 5:
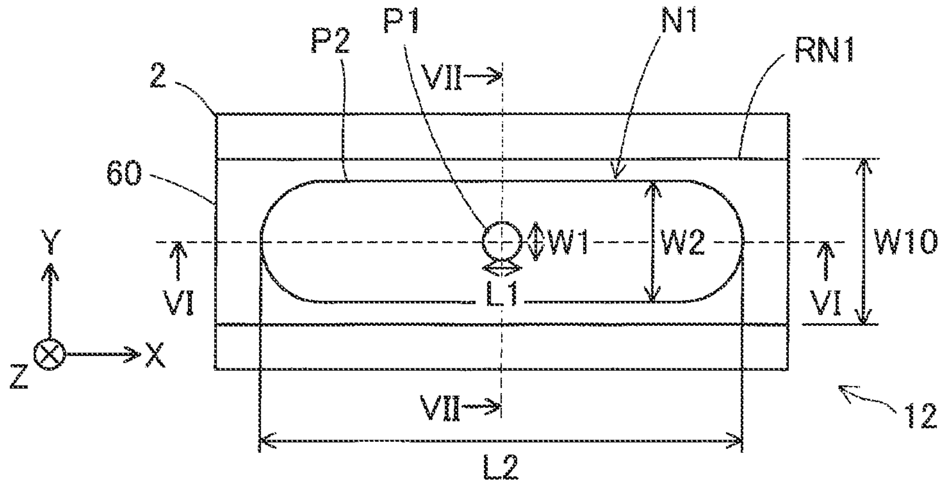
FIG. 5 is a diagram for explaining a first nozzle according to the present embodiment.
Figure 6:
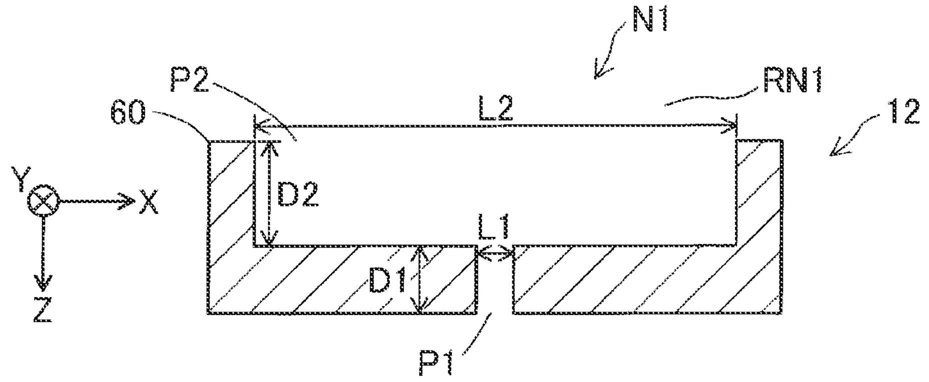
FIG. 6 is a diagram for explaining the first nozzle according to the present embodiment.
Figure 7:
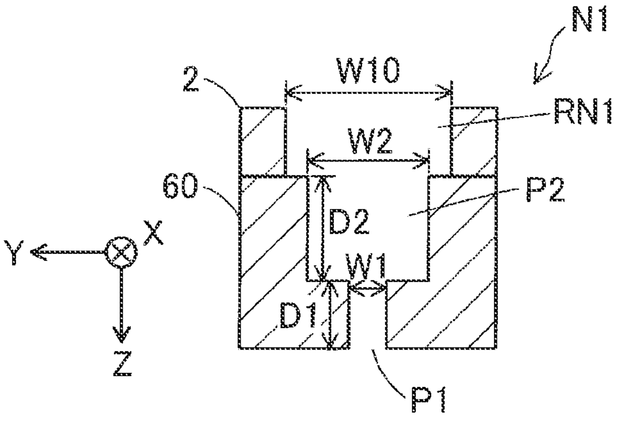
FIG. 7 is a diagram for explaining the first nozzle according to the present embodiment.

As described above, the liquid ejecting head 1 according to the present embodiment includes the first liquid ejecting head 11 including the first nozzle N1 and the second liquid ejecting head 12 including the second nozzle N2 larger in capacity than the first nozzle N1. The first nozzle N1 is a two-tiered nozzle. The second nozzle N2 is also a two-tiered nozzle. FIGS. 5 to 7 are diagrams for explaining the first nozzle N1 according to the present embodiment. FIG. 5 is a Z-directional view of the first nozzle N1. FIG. 6 illustrates a cross section taken along the line VI-VI of FIG. 5. FIG. 7 illustrates a cross section taken along the line VII-VII of FIG. 5. Note that, in FIGS. 5 to 7, the structure of the nozzle substrate 60 and the first nozzle N1 only in the nozzle flow passage RN of the first liquid ejecting head 11 (hereinafter referred to as "first nozzle flow passage RN1") is illustrated, and the illustration of the structure of others is omitted.

As illustrated in FIGS. 5 to 7, the first nozzle N1 includes a first portion P1 and a second portion P2. The second portion P2 is located closer to the first nozzle flow passage RN1 in the Z direction than the first portion P1 is. The first portion P1 and the second portion P2 are formed by processing the nozzle substrate 60 by using an etching technology or the like. The first portion P1 is connected from the +Z-directional side to approximately the center in the X direction and the Y direction of the second portion P2. The first portion P1 ejects ink supplied from the second portion P2 toward the outside. As illustrated in FIG. 5, the length L1 of the first portion P1 in the X direction is substantially equal to the width W1 of the first portion P1 in the Y direction, and the first portion P1 has a shape that looks like a circle when viewed in the Z direction.

As illustrated in FIGS. 5 to 7, the length L2, the width W2, and the depth D2 of the second portion P2 are greater than the length L1, the width W1, and the depth D1 of the first portion P1 respectively. The width W2 of the second portion P2 is less than the width W10 of the first nozzle flow passage RN1. The capacity of the second portion P2 is larger than the capacity of the first portion P1. As illustrated in FIG. 5, the second portion P2 has a shape that looks like a rectangle with arched X-directional two ends when viewed in the Z direction. A part of ink that flows through the first nozzle flow passage RN1 in the X direction flows into the second portion P2. At least a part of the ink having flowed into the second portion P2 is supplied to the first portion P1.

Figure 8:
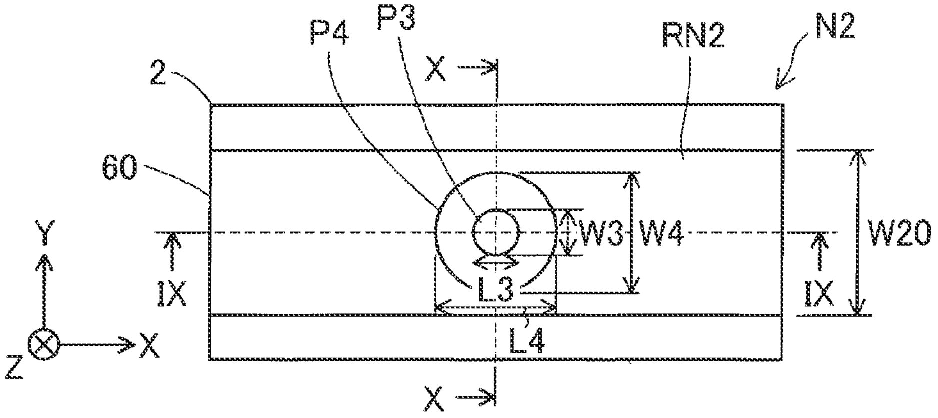
FIG. 8 is a diagram for explaining a second nozzle according to the present embodiment.
Figure 9:
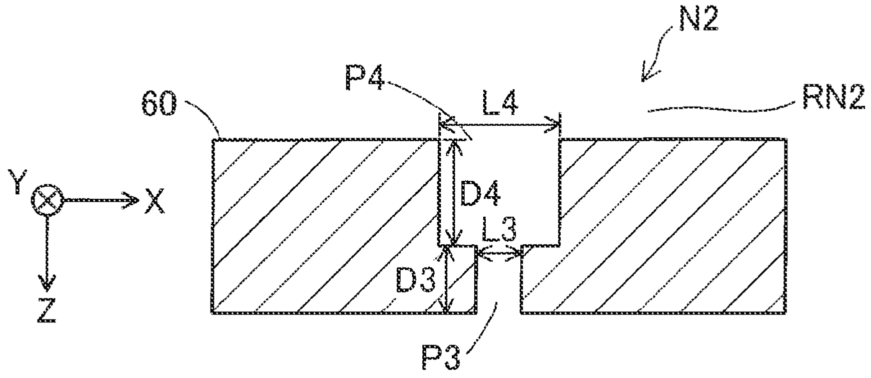
FIG. 9 is a diagram for explaining the second nozzle according to the present embodiment.
Figure 10:
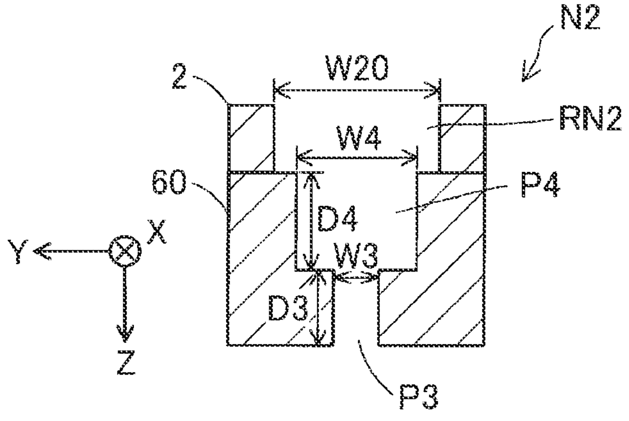
FIG. 10 is a diagram for explaining the second nozzle according to the present embodiment.

FIGS. 8 to 10 are diagrams for explaining the second nozzle N2 according to the present embodiment. FIG. 8 is a Z-directional view of the second nozzle N2. FIG. 9 illustrates a cross section taken along the line IX-IX of FIG. 8. FIG. 10 illustrates a cross section taken along the line X-X of FIG. 8. Note that, in FIGS. 8 to 10, the structure of the nozzle substrate 60 and the second nozzle N2 only in the nozzle flow passage RN of the second liquid ejecting head 12 (hereinafter referred to as "second nozzle flow passage RN2") is illustrated, and the illustration of the structure of others is omitted.

As illustrated in FIGS. 8 to 10, the second nozzle N2 includes a third portion P3 and a fourth portion P4. The fourth portion P4 is located closer to the second nozzle flow passage RN2 in the Z direction than the third portion P3 is. The third portion P3 and the fourth portion P4 are formed by processing the nozzle substrate 60 by using an etching technology or the like. The third portion P3 is connected from the +Z-directional side to approximately the center in the X direction and the Y direction of the fourth portion P4. The third portion P3 ejects ink supplied from the fourth portion P4 toward the outside. As illustrated in FIG. 8, the length L3 of the third portion P3 in the X direction is substantially equal to the width W3 of the third portion P3 in the Y direction, and the third portion P3 has a shape that looks like a circle when viewed in the Z direction.

As illustrated in FIGS. 8 to 10, the length L4, the width W4, and the depth D4 of the fourth portion P4 are greater than the length L3, the width W3, and the depth D3 of the third portion P3 respectively. The width W4 of the fourth portion P4 is less than the width W20 of the second nozzle flow passage RN2. The capacity of the fourth portion P4 is larger than the capacity of the third portion P3. As illustrated in FIG. 8, the fourth portion P4 has a shape that looks like a circle when viewed in the Z direction. It can also be said that the third portion P3 and the fourth portion P4 look like concentric circles when viewed in the Z direction. A part of ink that flows through the second nozzle flow passage RN2 in the X direction flows into the fourth portion P4. At least a part of the ink having flowed into the fourth portion P4 is supplied to the third portion P3.

In the present embodiment, the capacity of the first portion P1 is smaller than the capacity of the third portion P3. That is, an ink droplet ejected from the first nozzle N1 is smaller than an ink droplet ejected from the second nozzle N2. Therefore, the first liquid ejecting head 11 including the first nozzle N1 or the second liquid ejecting head 12 including the second nozzle N2 is used selectively according to the required size of an ink droplet.

Moreover, in the present embodiment, the length L2 of the second portion P2 in the X direction is greater than the length L4 of the fourth portion P4 in the X direction. For example, the length L2 is more than three times as great as the length L4. The inventors of the present application discovered that setting this relationship between the length L2 and the length L4 will improve the ink ejection performance of the first nozzle N1. When a two-tiered nozzle is applied to the first nozzle N1, which is capable of ejecting a smaller droplet than done by the second nozzle N2, ink replacement is harder to occur between the first nozzle N1 and the first nozzle flow passage RN1 because of a relatively small amount of ink ejection from the first nozzle N1. Moreover, because of a smaller ejection droplet, an amount of meniscus oscillations is smaller, and it is thus difficult to agitate the ink (ink circulation) inside the first nozzle N1 by means of the meniscus oscillations. For this reason, the ink whose viscosity has increased due to exposure to the air at a boundary interface between the first portion P1 and the air is prone to stagnate inside the first nozzle N1. The increase in the viscosity of the ink might make it difficult to eject the ink properly. Avoiding an excessive increase in ink viscosity is preferred especially when a small ink droplet is ejected. In view of these considerations, the inventors of the present application discovered that the efficiency of ink circulation inside the first nozzle N1 can be improved by designing the length L2 of the second portion P2 in the X direction to be relatively long, as in the present embodiment. This is presumably because, when the length L2 of the second portion P2 in the X direction is relatively long, the portion of contact of ink in the direction in which the ink flows, which is the X direction, is relatively large at a boundary interface between the first nozzle flow passage RN1 and the second portion P2, and this makes the ink flowing through the first nozzle flow passage RN1 become replaced with ink present inside the second portion P2 relatively frequently.

On the other hand, if the length L4 of the fourth portion P4 of the second nozzle N2, which is capable of ejecting a larger droplet than done by the first nozzle N1, is also relatively long, ink flowing through the second nozzle flow passage RN2 become replaced with ink present inside the fourth portion P4 excessively frequently, and this might make it difficult to eject the ink properly. For this reason, in the present embodiment, the length L2 of the second portion P2 in the X direction is set to be greater than the length L4 of the fourth portion P4 in the X direction.

In the liquid ejecting apparatus 100 according to the first embodiment described above, the capacity of the first portion P1 is smaller than the capacity of the second portion P2, the capacity of the third portion P3 is smaller than the capacity of the fourth portion P4, the capacity of the first portion P1 is smaller than the capacity of the third portion P3, and the length L2 of the second portion P2 in the X direction is greater than the length L4 of the fourth portion P4 in the X direction; therefore, it is possible to suppress an increase in viscosity of liquid inside the first nozzle N1, which is capable of ejecting a smaller droplet than done by the second nozzle N2. This makes it possible to configure not only the first nozzle N1 but also the second nozzle N2 as a two-tiered nozzle and thus improve the performance of ejecting the liquid.

B. EXAMPLES

An ejection test was conducted using the first nozzle N1 and the second nozzle N2 having various sizes. The ejection test was conducted by ejecting ink by using an ink-jet printer that includes the first liquid ejecting head 11 including the first nozzle N1 and the second liquid ejecting head 12 including the second nozzle N2. The results are shown in Tables 1 and 2 below. In Tables 1 and 2, all of the lengths L1, L2, L3, and L4, the widths W1, W2, W3, and W4, and the depths D1, D2, D3, and D4 are shown in micrometers. In addition, in Tables 1 and 2, the ratio of the length L2 to the length L1 is shown as "L2/L1", and the ratio of the length L4 to the length L3 is shown as "L4/L3". In Examples, the test was conducted on the first nozzle N1 and the second nozzle N2 for which the length L2 of the second portion P2 was set to be greater than the length L4 of the fourth portion P4. In Comparative Examples, the test was conducted on the first nozzle N1 and the second nozzle N2 for which the length L2 of the second portion P2 was set to be not greater than the length L4 of the fourth portion P4. Both in Examples and Comparative Examples, the capacity of the first portion P1 is smaller than the capacity of the third portion P3, the capacity of the first portion P1 is smaller than the capacity of the second portion P2, and the capacity of the third portion P3 is smaller than the capacity of the fourth portion P4. That is, the first nozzle N1 is a two-tiered nozzle capable of ejecting a smaller droplet than done by the second nozzle N2. The first portion P1 and the second portion P2, and the third portion P3 and the fourth portion P4, are each formed by etching a single nozzle substrate 60; therefore, the sum of the depth D1 and the depth D2, and the sum of the depth D3 and the depth D4, are each equal to the thickness of the nozzle substrate 60. In this ejection test, the nozzle substrate 60 having a thickness of 65 μm was used.

TABLE 1

| | First Nozzle (N1) | | | | | | | Second Nozzle (N2) | | | | | | | |
|---|---|---|---|---|---|---|---|---|---|---|---|---|---|---|---|
| | First Portion (P1) | | | Second Portion (P2) | | | | Third Portion (P3) | | | Fourth Portion (P4) | | | | |
| | Length L1 | Width W1 | Depth D1 | Length L2 | Width W2 | Depth D2 | L2/ L1 | Length L3 | Width W3 | Depth D3 | Length L4 | Width W4 | Depth D4 | L4/ L3 | Evalu- ation |
| Example 1 | 10 | 10 | 16 | 841 | 45 | 49 | 84.1 | 20 | 20 | 30 | 37 | 37 | 35 | 1.85 | Good |
| Example 2 | 10 | 10 | 25 | 841 | 45 | 40 | 84.1 | 20 | 20 | 30 | 37 | 37 | 35 | 1.85 | Good |
| Example 3 | 10 | 10 | 16 | 50 | 45 | 49 | 5 | 20 | 20 | 30 | 37 | 37 | 35 | 1.85 | Good |
| Example 4 | 10 | 10 | 16 | 70 | 45 | 49 | 7 | 20 | 20 | 30 | 37 | 37 | 35 | 1.85 | Good |
| Example 5 | 10 | 10 | 16 | 90 | 45 | 49 | 9 | 20 | 20 | 30 | 37 | 37 | 35 | 1.85 | Good |
| Example 6 | 10 | 10 | 16 | 120 | 45 | 49 | 12 | 20 | 20 | 30 | 37 | 37 | 35 | 1.85 | Good |
| Example 7 | 10 | 10 | 25 | 50 | 45 | 40 | 5 | 20 | 20 | 30 | 37 | 37 | 35 | 1.85 | Good |
| Example 8 | 10 | 10 | 25 | 70 | 45 | 40 | 7 | 20 | 20 | 30 | 37 | 37 | 35 | 1.85 | Good |
| Example 9 | 10 | 10 | 25 | 90 | 45 | 40 | 9 | 20 | 20 | 30 | 37 | 37 | 35 | 1.85 | Good |
| Example 10 | 10 | 10 | 25 | 120 | 45 | 40 | 12 | 20 | 20 | 30 | 37 | 37 | 35 | 1.85 | Good |
| Example 11 | 10 | 10 | 16 | 84 | 45 | 49 | 84.1 | 23 | 23 | 25 | 37 | 37 | 40 | 1.61 | Good |
| Example 12 | 10 | 10 | 16 | 841 | 45 | 49 | 84.1 | 26 | 26 | 35 | 37 | 37 | 30 | 1.42 | Good |

TABLE 2

| | First Nozzle (N1) | | | | | | | Second Nozzle (N2) | | | | | | | |
|---|---|---|---|---|---|---|---|---|---|---|---|---|---|---|---|
| | First Portion (P1) | | | Second Portion (P2) | | | | Third Portion (P3) | | | Fourth Portion (P4) | | | | |
| | Length L1 | Width W1 | Depth D1 | Length L2 | Width W2 | Depth D2 | L2/ L1 | Length L3 | Width W3 | Depth D3 | Length L4 | Width W4 | Depth D4 | L4/ L3 | Evalu- ation |
| Compar- ative Example 1 | 10 | 10 | 16 | 37 | 37 | 49 | 3.7 | 20 | 20 | 30 | 37 | 37 | 35 | 1.85 | Poor |
| Compar- ative Example 2 | 9 | 9 | 16 | 37 | 37 | 49 | 4.11 | 20 | 20 | 30 | 37 | 37 | 35 | 1.85 | Poor |
| Compar- ative Example 3 | 11 | 11 | 16 | 37 | 37 | 49 | 3.36 | 20 | 20 | 30 | 37 | 37 | 35 | 1.85 | Poor |
| Compar- ative Example 4 | 8 | 8 | 16 | 37 | 37 | 49 | 4.63 | 20 | 20 | 30 | 37 | 37 | 35 | 1.85 | Poor |
| Compar- ative Example 5 | 10 | 10 | 20 | 37 | 37 | 45 | 3.7 | 20 | 20 | 30 | 37 | 37 | 35 | 1.85 | Poor |
| Compar- ative Example 6 | 10 | 10 | 25 | 37 | 37 | 40 | 3.7 | 20 | 20 | 30 | 37 | 37 | 35 | 1.85 | Poor |
| Compar- ative Example 7 | 10 | 10 | 16 | 20 | 37 | 49 | 2 | 20 | 20 | 30 | 37 | 37 | 35 | 1.85 | Poor |
| Compar- ative Example 8 | 10 | 10 | 16 | 30 | 37 | 49 | 3 | 20 | 20 | 30 | 37 | 37 | 35 | 1.85 | Poor |

TABLE 2-continued

| | First Nozzle (N1) | | | | | | | Second Nozzle (N2) | | | | | | | |
|---|---|---|---|---|---|---|---|---|---|---|---|---|---|---|---|
| | First Portion (P1) | | | Second Portion (P2) | | | | Third Portion (P3) | | | Fourth Portion (P4) | | | | |
| | Length L1 | Width W1 | Depth D1 | Length L2 | Width W2 | Depth D2 | L2/L1 | Length L3 | Width W3 | Depth D3 | Length L4 | Width W4 | Depth D4 | L4/L3 | Evaluation |
| Comparative Example 9 | 10 | 10 | 16 | 50 | 45 | 49 | 5 | 20 | 20 | 30 | 50 | 37 | 35 | 2.5 | Poor |
| Comparative Example 10 | 10 | 10 | 16 | 120 | 45 | 49 | 12 | 20 | 20 | 30 | 120 | 37 | 35 | 6 | Poor |

"Evaluation" shown at the right end of Tables 1 and 2 indicates the evaluation of ejection performance in the ejection test. Specifically, "Good" means that an increase in viscosity of ink was observed neither inside the first nozzle N1 nor inside the second nozzle N2 and that the ink was ejected properly both from the first nozzle N1 and from the second nozzle N2. "Poor" means that the ink was not ejected properly from at least one of the first nozzle N1 or the second nozzle N2.

In Examples 1 to 10, the test was conducted while changing the size of the first nozzle N1 only, without changing the size of the second nozzle N2. Examples 1 and 2 have the same length L2 of the second portion P2, 841 μm; however, they are different from each other in that the depth D2 of the former is 49 μm whereas the depth D2 of the latter is 40 μm. The respective values of the length L2 of the second portion P2 of Examples 3 to 6 correspond to those of Examples 7 to 10, and the difference lies in the depth D2. Specifically, the length L2 of Examples 3 and 7 is 50 μm, the length L2 of Examples 4 and 8 is 70 μm, the length L2 of Examples 5 and 9 is 90 μm, and the length L2 of Examples 6 and 10 is 120 μm. The depth D2 of Examples 3 to 6 is 49 μm, and the depth D2 of Examples 7 to 10 is 40 μm. As shown by Examples 1 to 10, the evaluation result was "Good" when the length L2 of the second portion P2 was set to be greater than the length L4 of the fourth portion P4. The reasons for this evaluation can be inferred as follows. Firstly, at the second nozzle N2, which is configured to be able to eject a larger droplet than done by the first nozzle N1, the use of a two-tiered nozzle improved the performance of ink ejection, and good ink ejection was therefore performed. Secondly, at the first nozzle N1, which is configured to be able to eject a smaller droplet than done by the second nozzle N2, since the efficiency of ink circulation inside the first nozzle N1 is improved by designing the length L2 in the flow direction (the X direction described in the first embodiment) to be relatively long, an increase in viscosity of the ink inside first nozzle N1 is suppressed, and appropriate ink ejection is realized while adopting a two-tiered nozzle.

In Examples 11 and 12, the test was conducted while changing the size of the second nozzle N2 only from the size in Example 1, with the size of the first nozzle N1 set to be the same as the size in Example 1. The evaluation result was "Good" also in Examples 11 and 12, similarly to Examples 1 to 10. Good ink ejection was performed at the first nozzle N1 for the same reasons as those described above for Examples 1 to 10. At the second nozzle N2, ink was ejected properly even when the depth D4 of the fourth portion P4 is changed from that in Example 1. As is clear from the results of Examples 1 and 2 and from the results of Examples 3 to 6 and Examples 7 to 10, it can be inferred that the depth D2, D4 in the direction (Z direction) orthogonal to the direction (X direction) in which ink flows through the first nozzle flow passage RN1 and the second nozzle flow passage RN2 is less influential on the circulation of the ink, as compared with the length L2, L4.

In Comparative Examples 1 to 6, the test was conducted with the length of the second portion P2 set to be the same as the length of the fourth portion P4. The evaluation result was "Poor" in all of them. Though the ink was ejected properly at the second nozzle N2, the ink was not ejected properly at the first nozzle N1. This is presumably because the viscosity of the ink inside the first nozzle N1 increased due to a relatively low efficiency of ink circulation at the first nozzle flow passage RN1 and the second portion P2, which is caused due to the relatively short length L2 at the first nozzle N1, which is capable of ejecting a micro droplet. Moreover, as can be seen from the values of the depth D2 in Comparative Examples 1 to 6, regardless of the depth D2, the ink was not ejected properly. As will be understood also from this, the depth D2 seems to be less influential on the circulation of the ink than the length L2, as described about Examples above.

In Comparative Examples 7 and 8, the test was conducted with the size of the second nozzle N2 set to be the same as the size in Comparative Examples 1 to 6 and with the length L2 at the first nozzle N1 set to be less than the length L4 at the second nozzle N2. The evaluation result was "Poor" in both of them. Though the ink was ejected properly at the second nozzle N2, the ink was not ejected properly at the first nozzle N1. This is presumably because, as described in Comparative Examples 1 to 6, the viscosity of the ink inside the first nozzle N1 increased due to a relatively low efficiency of ink circulation at the second portion P2, which is caused due to the relatively short length L2.

In Comparative Examples 9 and 10, the length L2 of the second portion P2 and the length L4 of the fourth portion P4 were set to be equal to each other but greater than in Comparative Examples 1 to 8. Specifically, the length L2 and the length L4 were set to be 50 μm in Comparative Example 9, and the length L2 and the length L4 were set to be 120 μm in Comparative Example 10. The evaluation result was "Poor" in both of them. At the first nozzle N1, the ink was ejected properly because the efficiency of ink circulation increased thanks to a relatively great value of the length L2. On the other hand, at the second nozzle N2, the ink was not ejected properly in spite of a relatively great value of the length L4. The reason can be inferred as follows. At the second nozzle N2, which is capable of ejecting a larger droplet than done by the first nozzle N1, ink replacement occurs more frequently than at the first nozzle N1. Setting a great value for the length L4 at the second nozzle N2 having this feature could make ink replacement occur excessively frequently between the second nozzle N2 and the second nozzle flow passage RN2. This seems to be why the ink was not ejected properly.

As is clear from the results of the ejection test described above, by setting the length L2 of the second portion P2 of the first nozzle N1, which ejects a relatively small droplet, greater than the length L4 of the fourth portion P4 of the second nozzle N2, which ejects a relatively large droplet, it is possible to apply a two-tiered nozzle to both of the first nozzle N1 and the second nozzle N2 and thus improve the performance of ejecting the liquid.

C. Other Embodiments (C1) As disclosed in the above embodiment, the difference between the length of the first portion P1 and the length of the second portion P2 in the X direction may be greater than the difference between the length of the third portion P3 and the length of the fourth portion P4 in the X direction.

(C2) In the above embodiment, the width W2 of the second portion P2 in the Y direction may be equal to the width W4 of the fourth portion P4 in the Y direction. With this structure, as compared with a structure in which the width W2 of the second portion P2 in the Y direction is different from the width W4 of the fourth portion P4 in the Y direction, it is possible to make the density of the nozzles N in the liquid ejecting head 1 higher.

(C3) As disclosed in the above embodiment and Examples 1 to 12 described above, the depth D1 of the first portion P1 in the Z direction may be less than the depth D3 of the third portion P3 in the Z direction. With this structure, it is possible to suppress pressure loss of liquid at the first nozzle N1, which is capable of ejecting a smaller droplet than done by the second nozzle N2, and thus improve the performance of ejecting the liquid. Moreover, since it is possible to make the inertance of the first portion P1 smaller, the liquid inside the first portion P1 is easier to move, which makes the ejection of the liquid easier. The scope of the present disclosure is not limited to this example. The depth D1 of the first portion P1 in the Z direction may be greater than the depth D3 of the third portion P3 in the Z direction.

(C4) In the above embodiment, liquid is supplied to each of the plurality of nozzle flow passages RN via the common supply flow passage RA1, and the liquid is discharged from each of the plurality of nozzle flow passages RN via the common discharge flow passage RA2. However, the scope of the present disclosure is not limited to this example. A plurality of supply flow passages via which liquid is supplied to the plurality of nozzle flow passages RN respectively, and a plurality of discharge flow passages via which the liquid is discharged from the plurality of nozzle flow passages RN respectively, may be provided. In other words, individual supply flow passages continuous to, and individual discharge flow passages continuous from, the plurality of nozzle flow passages RN respectively may be provided.

(C5) In the above embodiment, the liquid ejecting head unit 10 includes the first liquid ejecting head 11 including the first nozzle N1 and the first nozzle flow passage RN1, and the second liquid ejecting head 12 including the second nozzle N2 and the second nozzle flow passage RN2. However, the scope of the present disclosure is not limited to this example. The liquid ejecting head unit 10 may include one or more third liquid ejecting heads including both a plurality of first nozzles N1 and a plurality of first nozzle flow passages RN1 and a plurality of second nozzles N2 and a plurality of second nozzle flow passages RN2. The liquid ejecting head unit 10 may include the first liquid ejecting head 11, the second liquid ejecting head 12, and the third liquid ejecting head.

(C6) In the above embodiment, the second portion P2 has a shape that looks like a rectangle with arched X-directional two ends when viewed in the Z direction, and the fourth portion P4 has a shape with arched X-directional two ends when viewed in the Z direction. However, the scope of the present disclosure is not limited to this example. The present disclosure may be modified such that at least one of the second portion P2 or the fourth portion P4 may have a shape with arched X-directional two ends when viewed in the Z direction.

Figure 11:
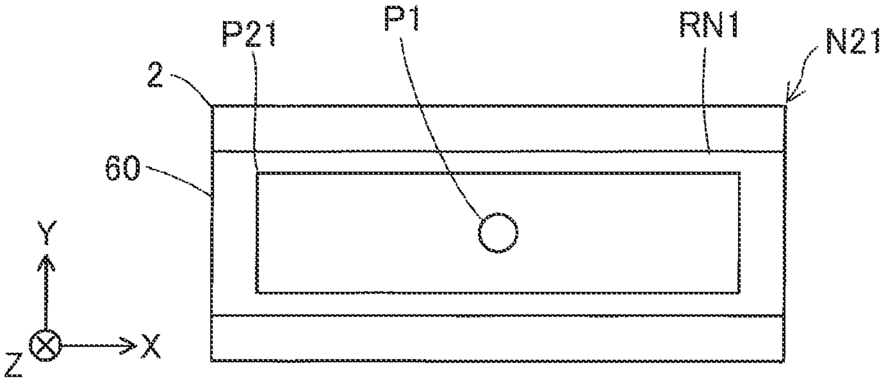
FIG. 11 is a diagram for explaining the first nozzle according to another embodiment.

(C7) In the above embodiment, the second portion P2 has a shape that looks like a rectangle with arched X-directional two ends when viewed in the Z direction, and the fourth portion P4 has a shape with arched X-directional two ends when viewed in the Z direction. However, the scope of the present disclosure is not limited to this example. FIG. 11 is a diagram for explaining a first nozzle N21 according to another embodiment. Note that FIG. 11 illustrates a schematic structure of the first nozzle N21 when viewed in the Z direction. As illustrated in FIG. 11, four corners of a second portion P21 of the first nozzle N21 may be right angled when viewed in the Z direction. The term "right angle" in the present disclosure is not limited to 90° but means a broader concept encompassing an angular range from 85° to 95°. Four corners of not only the second portion P2 but also the fourth portion P4 may be right angled when viewed in the Z direction. Four corners of either one, the second portion P2 or the fourth portion P4, may be right angled when viewed in the Z direction. Having right-angled four corners as described here makes the capacity of the second portion P2 and the capacity of the fourth portion P4 larger, as compared with a non-right-angled structure.

Figure 12:
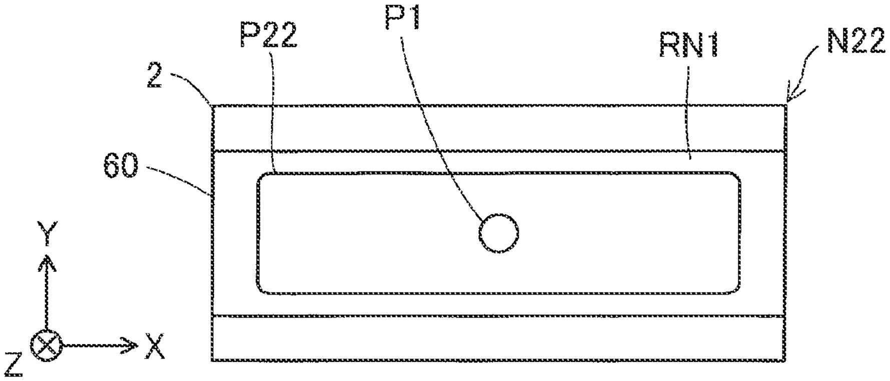
FIG. 12 is a diagram for explaining the first nozzle according to another embodiment.

(C8) In the above embodiment, the second portion P2 has a shape that looks like a rectangle with arched X-directional two ends when viewed in the Z direction, and the fourth portion P4 has a shape with arched X-directional two ends when viewed in the Z direction. However, the scope of the present disclosure is not limited to this example. FIG. 12 is a diagram for explaining a first nozzle N22 according to another embodiment. Note that FIG. 12 illustrates a schematic structure of the first nozzle N22 when viewed in the Z direction. As illustrated in FIG. 12, four corners of a second portion P22 of the first nozzle N22 may be rounded when viewed in the Z direction. Alternatively, though not illustrated, four corners of the second portion P2 of the first nozzle N1 may be chamfered when viewed in the Z direction. Four corners of not only the second portion P2 but also the fourth portion P4 may be rounded or chamfered when viewed in the Z direction. Four corners of either one, the second portion P2 or the fourth portion P4, may be rounded or chamfered when viewed in the Z direction. Corner rounding or chamfering described above makes it possible to suppress pressure loss occurring when liquid is supplied from the nozzle flow passage RN to the second portion P2 and the fourth portion P4.

Figure 13:
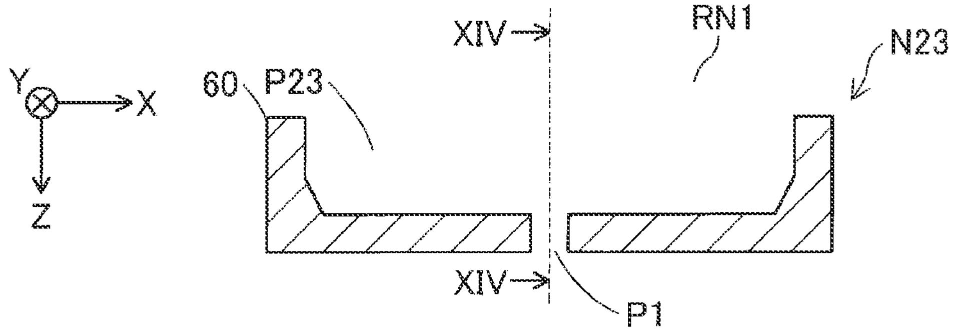
FIG. 13 is a diagram for explaining the first nozzle according to another embodiment.
Figure 14:
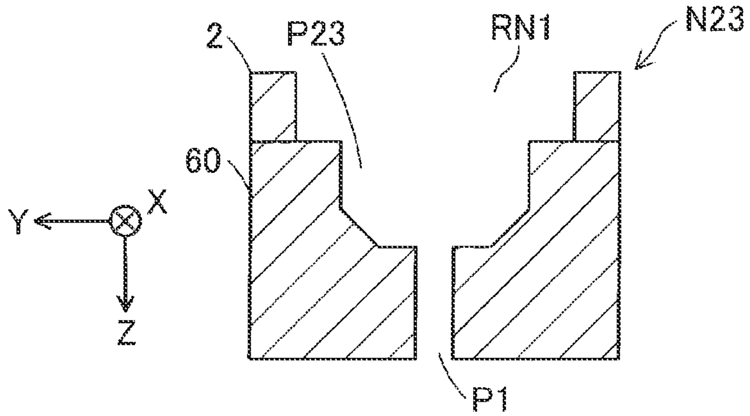
FIG. 14 is a diagram for explaining the first nozzle according to another embodiment.

(C9) In the above embodiment, the second portion P2 may be chamfered or rounded at its end portion located at the side closer to the first portion P1. The fourth portion P4 may be chamfered or rounded at its end portion located at the side closer to the third portion P3. FIGS. 13 and 14 are diagrams for explaining a first nozzle N23 according to another embodiment. FIG. 13 illustrates a cross section parallel to an X-Z plane of the first nozzle N23. FIG. 14 illustrates a cross section taken along the line XIV-XIV of FIG. 13. As illustrated in FIGS. 13 and 14, chamfering the end portion, of a second portion P23, located at the side closer to the first portion P1 makes it possible to suppress pressure loss of liquid flowing in the +Z direction from the second portion P23 into the first portion P1, as compared with a non-chamfered structure. The processing is not limited to chamfering but may be rounding. Though not illustrated, not only the above-mentioned end portion of the second portion P23 but also the end portion, of the fourth portion P4, located at the side closer to the third portion P3 may be chamfered or rounded. Either one only, the second portion P23 or the fourth portion P4, may be chamfered or rounded. The length L2 of the second portion P23 in this structure means the length in the X direction of its end portion located at the side closer to a first nozzle flow passage RN13. Similarly, the length L4 of the fourth portion P4 means the length in the X direction of its end portion located at the side closer to the second nozzle flow passage RN2.

Figure 15:
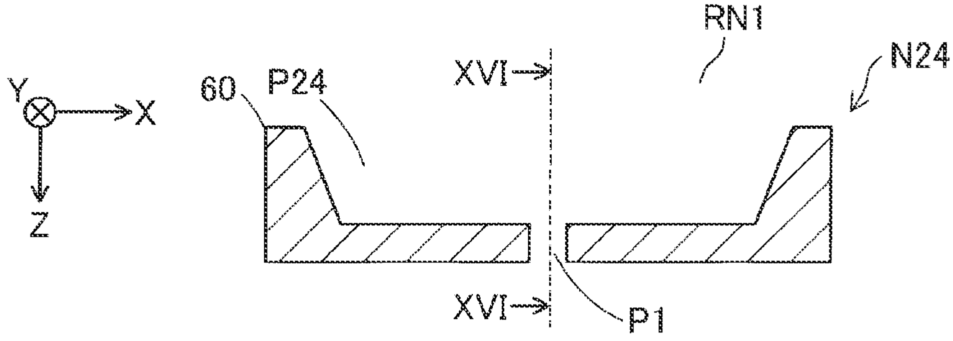
FIG. 15 is a diagram for explaining the first nozzle according to another embodiment.
Figure 16:
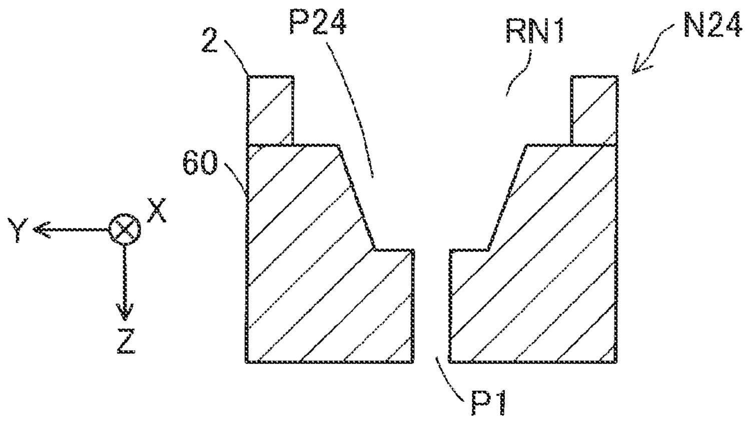
FIG. 16 is a diagram for explaining the first nozzle according to another embodiment.

(C10) In the above embodiment, the second portion P2 may be tapered toward the side opposite to the first nozzle flow passage RN1 in the Z direction. The fourth portion P4 may be tapered toward the side opposite to the second nozzle flow passage RN2 in the Z direction. FIGS. 15 and 16 are diagrams for explaining a first nozzle N24 according to another embodiment. FIG. 15 illustrates a cross section parallel to an X-Z plane of the first nozzle N24. FIG. 16 illustrates a cross section taken along the line XVI-XVI of FIG. 15. As illustrated in FIGS. 15 and 16, tapering a second portion P24 toward the side opposite to the first nozzle flow passage RN1 in the Z direction makes it possible to suppress pressure loss of liquid flowing in the +Z direction from the first nozzle flow passage RN1 into the second portion P24, as compared with a non-tapered structure. Though not illustrated, not only the second portion P24 but also the fourth portion P4 may be tapered toward the side opposite to the second nozzle flow passage RN2 in the Z direction. Either one only, the second portion P24 or the fourth portion P4, may be tapered. The length L2 of the second portion P24 in this structure means the length in the X direction of its end portion located at the side closer to the first nozzle flow passage RN1. Similarly, the length L4 of the fourth portion P4 means the length in the X direction of its end portion located at the side closer to the second nozzle flow passage RN2.

Figure 17:
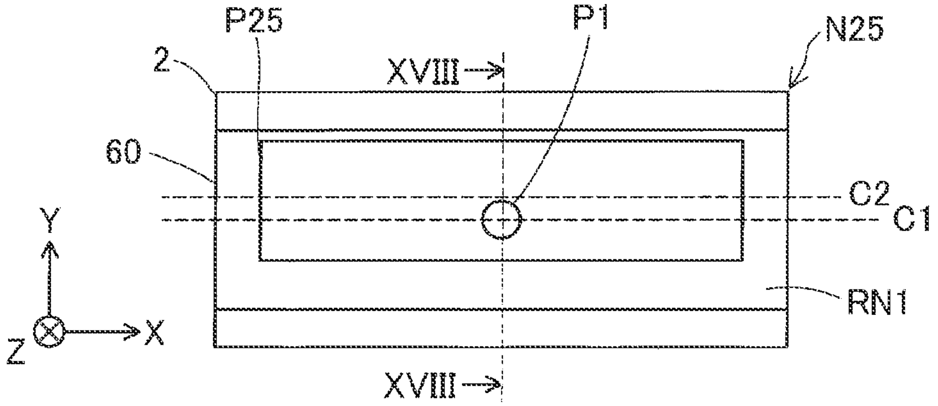
FIG. 17 is a diagram for explaining the first nozzle according to another embodiment.
Figure 18:
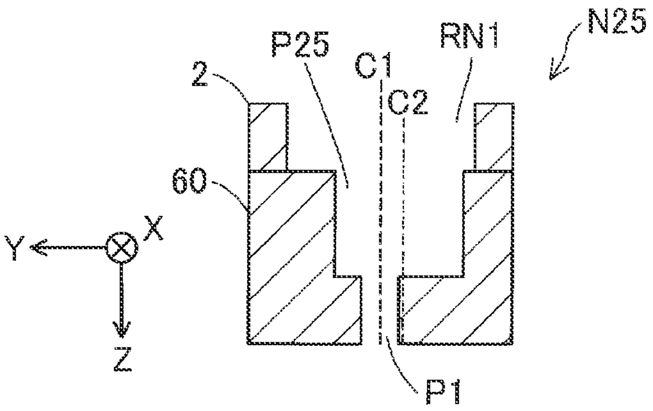
FIG. 18 is a diagram for explaining the first nozzle according to another embodiment.

(C11) In the above embodiment, the center of the second portion P2 in the Y direction may be displaced from the center of the first nozzle flow passage RN1 in the Y direction. The center of the fourth portion P4 in the Y direction may be displaced from the center of the second nozzle flow passage RN2 in the Y direction. FIGS. 17 and 18 are diagrams for explaining a first nozzle N25 according to another embodiment. FIG. 17 illustrates a schematic structure of the first nozzle N25 when viewed in the Z direction. FIG. 18 illustrates a cross section taken along the line XVIII-XVIII of FIG. 17. As illustrated in FIGS. 17 and 18, in this structure, the center C2 of a second portion P25 in the Y direction is displaced from the center C1 of the first nozzle flow passage RN1 in the Y direction. The center of the first portion P1 is substantially the same as the center C1 of the first nozzle flow passage RN1. In the first nozzle flow passage RN1, in some instances the location where liquid flows at the highest velocity is off the center in the Y direction. In such a case, displacing the center C2 of the second portion P25 in the Y direction from the center C1 of the first nozzle flow passage RN1 in the Y direction, as in this structure, makes it possible to adjust the position of the second portion P25 to the fastest flow portion of the first nozzle flow passage RN1. With this structure, in a case where the fastest flow portion is off the center of the first nozzle flow passage RN1 in the Y direction, as compared with a structure in which the center of the first nozzle flow passage RN1 in the Y direction is substantially the same as that of the second portion P25, liquid replacement occurs more frequently between the first nozzle flow passage RN1 and the second portion P25, and, therefore, it is possible to suppress an increase in viscosity of the liquid inside the first nozzle N25. Similarly, though not illustrated, the center of the fourth portion P4 in the Y direction may be displaced from the center of the second nozzle flow passage RN2 in the Y direction.

(C12) In the above embodiment, the first portion P1 and the second portion P2 may have the same width W1, W2 in the Y direction. The third portion P3 and the fourth portion P4 may have the same width W3, W4 in the Y direction. The first portion P1, the second portion P2, the third portion P3, and the fourth portion P4 may have the same width W1, W2, W3, W4 in the Y direction.

(C13) In the above embodiment, the first portion P1 and the third portion P3 have a shape that looks like a circle when viewed in the Z direction. However, the scope of the present disclosure is not limited to this example. The first portion P1 and the third portion P3 may have any shape when viewed in the Z direction.

D. Other Modes

The scope of the present disclosure is not limited to the foregoing embodiments. The present disclosure may be modified in various ways within a range of not departing from its spirit. For example, technical features in the foregoing embodiments corresponding to technical features in each mode described in SUMMARY section of this specification may be replaced or combined in order to solve a part or a whole of problems described above or produce a part or a whole of effects described above. Some technical features may be deleted where unnecessary unless they are explained explicitly as indispensable in this specification.

(1) In a certain mode of the present disclosure, a liquid ejecting head unit is provided. The liquid ejecting head unit includes: a plurality of first nozzle flow passages extending in an X direction, liquid flowing therethrough in the X direction; a plurality of first nozzles arranged in a Y direction intersecting with the X direction, each of the plurality of first nozzles being continuous from corresponding one of the plurality of first nozzle flow passages, the liquid flowing through the first nozzle flow passage in the X direction being ejected from the first nozzle in a Z direction intersecting with the X direction and with the Y direction; a plurality of second nozzle flow passages extending in the X direction, liquid flowing therethrough in the X direction; and a plurality of second nozzles arranged in the Y direction, each of the plurality of second nozzles being continuous from corresponding one of the plurality of second nozzle flow passages, the liquid flowing through the second nozzle flow passage in the X direction being ejected from the second nozzle in the Z direction, wherein the first nozzle includes a first portion and a second portion, the second portion being located closer to the first nozzle flow passage in the Z direction than the first portion is, the second nozzle includes a third portion and a fourth portion, the fourth portion being located closer to the second nozzle flow passage in the Z direction than the third portion is, capacity of the first portion is smaller than capacity of the second portion, capacity of the third portion is smaller than capacity of the fourth portion, the capacity of the first portion is smaller than the capacity of the third portion, and a length of the second portion in the X direction is greater than a length of the fourth portion in the X direction.

With the liquid ejecting head unit according to this mode, since the capacity of the first portion is smaller than the capacity of the second portion, the capacity of the third portion is smaller than the capacity of the fourth portion, the capacity of the first portion is smaller than the capacity of the third portion, and the length of the second portion in the X direction is greater than the length of the fourth portion in the X direction, it is possible to suppress an increase in viscosity of liquid inside the first nozzle that is capable of ejecting a smaller droplet than done by the second nozzle. This makes it possible to configure not only the first nozzle, which is capable of ejecting a smaller droplet than done by the second nozzle, but also the second nozzle as a two-tiered nozzle, and thus improve the performance of ejecting the liquid.

(2) In the liquid ejecting head unit according to the above mode, the length of the second portion in the X direction may be greater than a length of the first portion in the X direction.

(3) In the liquid ejecting head unit according to the above mode, the length of the second portion in the X direction may be more than three times as great as the length of the first portion in the X direction.

With the liquid ejecting head unit according to this mode, since the length of the second portion in the X direction is more than three times as great as the length of the first portion in the X direction, as compared with a structure in which the length of the second portion in the X direction is not more than three times as great as the length of the first portion in the X direction, it is possible to improve the efficiency of ink circulation inside the first nozzle, thereby suppressing an increase in viscosity of the ink.

(4) In the liquid ejecting head unit according to the above mode, the length of the second portion in the X direction may be more than five times as great as the length of the first portion in the X direction.

With the liquid ejecting head unit according to this mode, since the length of the second portion in the X direction is more than five times as great as the length of the first portion in the X direction, as compared with a structure in which the length of the second portion in the X direction is not more than five times as great as the length of the first portion in the X direction, it is possible to further improve the efficiency of ink circulation inside the first nozzle, thereby achieving a greater suppression of an increase in viscosity of the ink.

(5) In the liquid ejecting head unit according to the above mode, the length of the fourth portion in the X direction may be greater than a length of the third portion in the X direction.

(6) In the liquid ejecting head unit according to the above mode, a difference between a length of the first portion in the X direction and the length of the second portion in the X direction may be greater than a difference between a length of the third portion in the X direction and the length of the fourth portion in the X direction.

(7) In the liquid ejecting head unit according to the above mode, a width of the second portion in the Y direction may be equal to a width of the fourth portion in the Y direction.

With the liquid ejecting head unit according to this mode, since the width of the second portion in the Y direction is equal to the width of the fourth portion in the Y direction, as compared with a structure in which the width of the second portion in the Y direction is different from the width of the fourth portion in the Y direction, it is possible to make the density of the nozzles in the liquid ejecting head 1 higher.

(8) In the liquid ejecting head unit according to the above mode, a depth of the first portion in the Z direction may be less than a depth of the second portion in the Z direction, and a depth of the third portion in the Z direction may be less than a depth of the fourth portion in the Z direction.

With the liquid ejecting head unit according to this mode, since the depth of the first portion in the Z direction is less than the depth of the second portion in the Z direction, and the depth of the third portion in the Z direction is less than the depth of the fourth portion in the Z direction, as compared with a structure in which the depth of the first portion is greater than the depth of the second portion, and the depth of the third portion is greater than the depth of the fourth portion, it is possible to suppress pressure loss of liquid inside the first portion and the third portion and thus improve the performance of ejecting the liquid. Moreover, since it is possible to make the inertance of the first portion and the third portion smaller, the liquid inside the first portion and the third portion is easier to move, which makes the ejection of the liquid easier.

(9) In the liquid ejecting head unit according to the above mode, the depth of the first portion in the Z direction may be less than the depth of the third portion in the Z direction.

With the liquid ejecting head unit according to this mode, it is possible to suppress pressure loss of liquid at the first nozzle that is capable of ejecting a smaller droplet than done by the second nozzle and thus improve the performance of ejecting the liquid. Moreover, since it is possible to make the inertance of the first portion smaller, the liquid inside the first portion is easier to move, which makes the ejection of the liquid easier.

(10) The liquid ejecting head unit according to the above mode may further include: a common supply flow passage connected indirectly or directly to one end of each of the plurality of first nozzle flow passages in a shared manner to supply the liquid to each of the plurality of first nozzle flow passages; and a common discharge flow passage connected indirectly or directly to another end of each of the plurality of first nozzle flow passages in a shared manner to discharge the liquid from each of the plurality of first nozzle flow passages.

Since the liquid ejecting head unit according to this mode further includes the common supply flow passage and the common discharge flow passage, as compared with a structure in which the common supply flow passage and the common discharge flow passage are not provided, it is possible to circulate the liquid inside the common supply flow passage and the common discharge flow passage and thus suppress the stagnation of the liquid.

(11) The liquid ejecting head unit according to the above mode may include: a first liquid ejecting head in which the plurality of first nozzles and the plurality of first nozzle flow passages are provided; and a second liquid ejecting head in which the plurality of second nozzles and the plurality of second nozzle flow passages are provided. That is, micro nozzles and ordinary nozzles may be provided in separate liquid ejecting heads.

With the liquid ejecting head unit according to this mode, since the first nozzles are provided in the first liquid ejecting head and the second nozzles are provided in the second liquid ejecting head, in the event of occurrence of abnormal liquid ejection, it is possible to easily identify the nozzle that is the cause of the abnormality and thus enhance the ease of maintenance as compared with a structure in which the first nozzles and the second nozzles are provided in a single liquid ejecting head.

(12) The liquid ejecting head unit according to the above mode may include: a third liquid ejecting head in which the plurality of first nozzles, the plurality of first nozzle flow passages, the plurality of second nozzles, and the plurality of second nozzle flow passages are provided. That is, micro nozzles and ordinary nozzles may be provided in a single liquid ejecting head.

With the liquid ejecting head unit according to this mode, since the first nozzles and the second nozzles are provided in the third liquid ejecting head, it is possible to make the liquid ejecting head unit more compact as compared with a structure in which the first nozzles and the second nozzles are provided in different liquid ejecting heads.

(13) In the liquid ejecting head unit according to the above mode, four corners of at least one of the second portion or the fourth portion may be right angled when viewed in the Z direction.

With the liquid ejecting head unit according to this mode, since the four corners of at least one of the second portion or the fourth portion are right angled when viewed in the Z direction, it is possible to make the capacity of the second portion and the capacity of the fourth portion larger as compared with a non-right-angled structure.

(14) In the liquid ejecting head unit according to the above mode, four corners of at least one of the second portion or the fourth portion may be chamfered or rounded when viewed in the Z direction.

With the liquid ejecting head unit according to this mode, since the four corners of at least one of the second portion or the fourth portion are chamfered or rounded when viewed in the Z direction, it is possible to suppress pressure loss occurring when the liquid is supplied from the nozzle flow passage to the second portion and the fourth portion as compared with a non-chamfered or non-rounded structure.

(15) In the liquid ejecting head unit according to the above mode, two ends in the X direction of at least one of the second portion or the fourth portion may be arched when viewed in the Z direction.

With the liquid ejecting head unit according to this mode, since the two ends in the X direction of at least one of the second portion or the fourth portion are arched when viewed in the Z direction, it is possible to suppress pressure loss occurring when the liquid is supplied from the nozzle flow passage to the second portion and the fourth portion as compared with a non-arched structure.

(16) In the liquid ejecting head unit according to the above mode, the second portion may be chamfered or rounded at an end portion located at a side closer to the first portion, and the fourth portion may be chamfered or rounded at an end portion located at a side closer to the third portion.

With the liquid ejecting head unit according to this mode, since the second portion is chamfered or rounded at the end portion located at the side closer to the first portion, and the fourth portion is chamfered or rounded at the end portion located at the side closer to the third portion, it is possible to suppress pressure loss of the liquid flowing from the second portion into the first portion and the liquid flowing from the fourth portion into the third portion as compared with a non-chamfered or non-rounded structure.

(17) In the liquid ejecting head unit according to the above mode, the second portion may be tapered toward a side opposite to the first nozzle flow passage in the Z direction, and the fourth portion may be tapered toward a side opposite to the second nozzle flow passage in the Z direction.

With the liquid ejecting head unit according to this mode, since the second portion is tapered toward the side opposite to the first nozzle flow passage in the Z direction, and the fourth portion is tapered toward the side opposite to the second nozzle flow passage in the Z direction, it is possible to suppress pressure loss of the liquid supplied from the second portion to the first portion and the liquid supplied from the fourth portion to the third portion as compared with a non-tapered structure.

(18) In the liquid ejecting head unit according to the above mode, a center of the second portion in the Y direction may be displaced from a center of the first nozzle flow passage in the Y direction, and a center of the fourth portion in the Y direction may be displaced from a center of the second nozzle flow passage in the Y direction.

With the liquid ejecting head unit according to this mode, since the center of the second portion in the Y direction is displaced from the center of the first nozzle flow passage in the Y direction, and the center of the fourth portion in the Y direction is displaced from the center of the second nozzle flow passage in the Y direction, in a case where the fastest flow portion is off the center of the nozzle flow passage in the Y direction, liquid replacement occurs more frequently between the nozzle flow passage and the second portion and the fourth portion, and, therefore, it is possible to suppress an increase in viscosity of the liquid inside the first nozzle and the second nozzle, as compared with a structure in which the center of the second portion in the Y direction is the same as the center of the first nozzle flow passage in the Y direction, and the center of the fourth portion in the Y direction is the same as the center of the second nozzle flow passage in the Y direction.

(19) In another mode of the present disclosure, a liquid ejecting apparatus is provided. The liquid ejecting apparatus includes: the liquid ejecting head unit according to the above mode; and a control unit that controls operation of ejecting the liquid from the liquid ejecting head unit.

The scope of application of the present disclosure is not limited to an ink-jet scheme; the present disclosure may be applied to a liquid ejecting apparatus configured to eject any kind of liquid other than ink, and a liquid ejecting head unit used in the liquid ejecting apparatus. For example, the present disclosure may be applied to the following various kinds of liquid ejecting apparatus and its liquid ejecting head unit:

(1) Image recording apparatus such as a facsimile apparatus or the like;
(2) Colorant ejecting apparatus used in color filter production for an image display device such as a liquid crystal display or the like;
(3) Electrode material ejecting apparatus used for forming electrodes of an organic EL (Electro Luminescence) display, a surface-emitting display (Field Emission Display, FED), or the like;
(4) Liquid ejecting apparatus for ejecting liquid containing a living organic material used in biochip fabrication;
(5) Sample ejecting apparatus as a high precision pipette;
(6) Lubricating oil ejecting apparatus;
(7) Liquid resin ejecting apparatus;
(8) Liquid ejecting apparatus for ejecting, with pinpoint accuracy, lubricating oil onto a precision device such as a watch, a camera, or the like;
(9) Liquid ejecting apparatus for ejecting transparent liquid resin such as ultraviolet ray curing resin or the like onto a substrate so as to form a micro hemispherical lens (optical lens) used in an optical communication element, or the like;

(10) Liquid ejecting apparatus for ejecting an acid etchant or an alkaline etchant for etching a substrate or the like;

(11) Liquid ejecting apparatus equipped with a liquid consumption head for ejecting any other micro-amount droplets.

The "liquid" may be any material that can be consumed by a liquid ejecting apparatus. For example, "liquid" may be any material that is in a liquid phase, including but not limited to: a material that is in a state of liquid having high viscosity or low viscosity, sol or gel water, other inorganic solvent or organic solvent, solution, liquid resin, and liquid metal (metal melt). In addition, not only a liquid as one state of a substance but also a liquid in which particles of a functional material formed of a solid substance such as pigments, metal particles, or the like are dissolved, dispersed, or mixed in a solvent are included in the "liquid". Typical examples of the "liquid" are as follows:

(1) Principal agent and curative agent of an adhesive;

(2) Base paint and dilution agent, clear paint and dilution agent;

(3) Principal dissolvent containing cells of cell ink and dilution agent;

(4) Metallic leaf pigment dispersion liquid and dilution agent of ink for a metallic gloss finish (metallic ink);

(5) Gasoline, light oil, and bio-based fuel for vehicles;

(6) Principal ingredient and protective ingredient of a medicine;

(7) Fluorescent substance and sealant of a light-emitting diode (LED).

What is claimed is:

1. A liquid ejecting head unit, comprising:

a plurality of first nozzle flow passages extending in an X direction, liquid flowing therethrough in the X direction;

a plurality of first nozzles arranged in a Y direction intersecting with the X direction, each of the plurality of first nozzles being continuous from corresponding one of the plurality of first nozzle flow passages, the liquid flowing through the first nozzle flow passage in the X direction being ejected from the first nozzle in a Z direction intersecting with the X direction and with the Y direction;

a plurality of second nozzle flow passages extending in the X direction, liquid flowing therethrough in the X direction; and a plurality of second nozzles arranged in the Y direction, each of the plurality of second nozzles being continuous from corresponding one of the plurality of second nozzle flow passages, the liquid flowing through the second nozzle flow passage in the X direction being ejected from the second nozzle in the Z direction, wherein the first nozzle includes a first portion and a second portion, the second portion being located closer to the first nozzle flow passage in the Z direction than the first portion is, the second nozzle includes a third portion and a fourth portion, the fourth portion being located closer to the second nozzle flow passage in the Z direction than the third portion is, capacity of the first portion is smaller than capacity of the second portion, capacity of the third portion is smaller than capacity of the fourth portion, the capacity of the first portion is smaller than the capacity of the third portion, and a length of the second portion in the X direction is greater than a length of the fourth portion in the X direction.

2. The liquid ejecting head unit according to claim 1, wherein the length of the second portion in the X direction is greater than a length of the first portion in the X direction.

3. The liquid ejecting head unit according to claim 2, wherein the length of the second portion in the X direction is more than three times as great as the length of the first portion in the X direction.

4. The liquid ejecting head unit according to claim 3, wherein the length of the second portion in the X direction is more than five times as great as the length of the first portion in the X direction.

5. The liquid ejecting head unit according to claim 1, wherein the length of the fourth portion in the X direction is greater than a length of the third portion in the X direction.

6. The liquid ejecting head unit according to claim 1, wherein a difference between a length of the first portion in the X direction and the length of the second portion in the X direction is greater than a difference between a length of the third portion in the X direction and the length of the fourth portion in the X direction.

7. The liquid ejecting head unit according to claim 1, wherein a width of the second portion in the Y direction is equal to a width of the fourth portion in the Y direction.

8. The liquid ejecting head unit according to claim 1, wherein a depth of the first portion in the Z direction is less than a depth of the second portion in the Z direction, and a depth of the third portion in the Z direction is less than a depth of the fourth portion in the Z direction.

9. The liquid ejecting head unit according to claim 8, wherein the depth of the first portion in the Z direction is less than the depth of the third portion in the Z direction.

10. The liquid ejecting head unit according to claim 1, further comprising:

a common supply flow passage connected indirectly or directly to one end of each of the plurality of first nozzle flow passages in a shared manner to supply the liquid to each of the plurality of first nozzle flow passages; and a common discharge flow passage connected indirectly or directly to another end of each of the plurality of first nozzle flow passages in a shared manner to discharge the liquid from each of the plurality of first nozzle flow passages.

11. The liquid ejecting head unit according to claim 1, comprising:

a first liquid ejecting head in which the plurality of first nozzles and the plurality of first nozzle flow passages are provided; and a second liquid ejecting head in which the plurality of second nozzles and the plurality of second nozzle flow passages are provided.

12. The liquid ejecting head unit according to claim 1, comprising:

a third liquid ejecting head in which the plurality of first nozzles, the plurality of first nozzle flow passages, the plurality of second nozzles, and the plurality of second nozzle flow passages are provided.

13. The liquid ejecting head unit according to claim 1, wherein four corners of at least one of the second portion or the fourth portion are right angled when viewed in the Z direction.

14. The liquid ejecting head unit according to claim 1, wherein four corners of at least one of the second portion or the fourth portion are chamfered or rounded when viewed in the Z direction.

15. The liquid ejecting head unit according to claim 1, wherein two ends in the X direction of at least one of the second portion or the fourth portion are arched when viewed in the Z direction.

16. The liquid ejecting head unit according to claim 1, wherein the second portion is chamfered or rounded at an end portion located at a side closer to the first portion, and the fourth portion is chamfered or rounded at an end portion located at a side closer to the third portion.

17. The liquid ejecting head unit according to claim 1, wherein the second portion is tapered toward a side opposite to the first nozzle flow passage in the Z direction, and the fourth portion is tapered toward a side opposite to the second nozzle flow passage in the Z direction.

18. The liquid ejecting head unit according to claim 1, wherein a center of the second portion in the Y direction is displaced from a center of the first nozzle flow passage in the Y direction, and a center of the fourth portion in the Y direction is displaced from a center of the second nozzle flow passage in the Y direction.

19. A liquid ejecting apparatus, comprising:

the liquid ejecting head unit according to claim 1; and a control unit that controls operation of ejecting the liquid from the liquid ejecting head unit.

* * * * *